Figure 1:
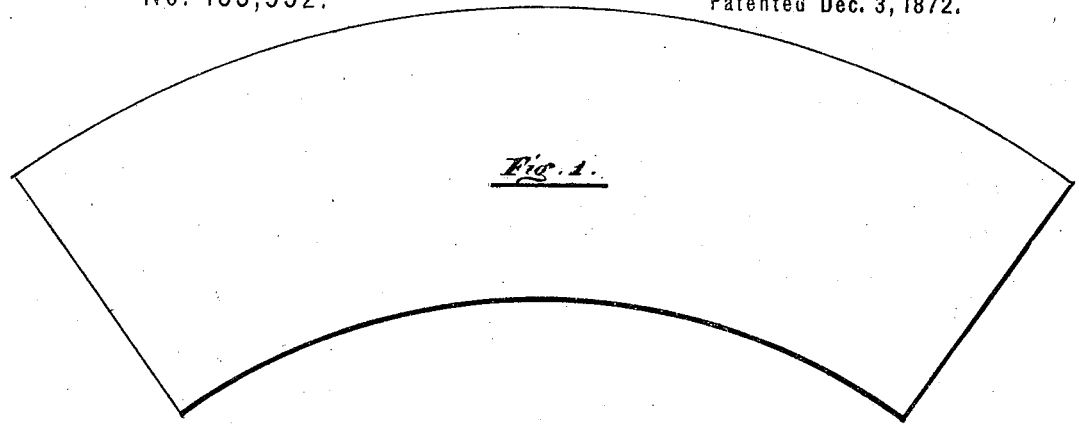
Figure 2:
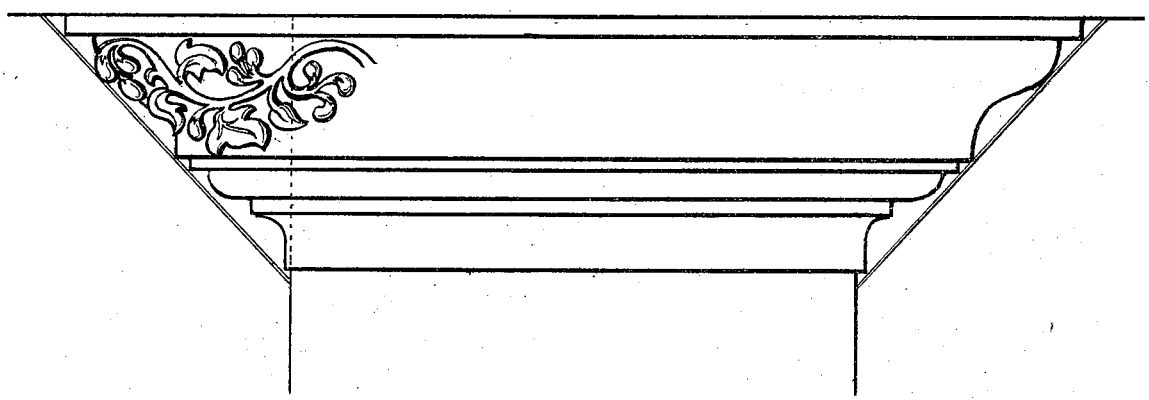

L. W. HEMP.
Process of Stamping Sheet-Metal.

No. 133,532. Patented Dec. 3, 1872.

Witnesses.
Edmund P. Schreiner.
Adolph E. Schmidt.

Inventor,
Louis. W. Hemp

UNITED STATES PATENT OFFICE.

LOUIS W. HEMP, OF ST. LOUIS, MISSOURI.

IMPROVEMENT IN PROCESSES OF STAMPING SHEET METAL.

Specification forming part of Letters Patent No. 133,532, dated December 3, 1872.

*To all whom it may concern:*

Be it known that I, LOUIS W. HEMP, of the city and county of St. Louis and State of Missouri, have invented a new and Improved Process of Stamping Sheet Metal into moldings or ornaments whose general form is conical or pyramidical, of which the following is a specification:

After the old system of stamping all the conical or pyramidical articles are formed by stamping the required shape successively into a plate of metal with the aid of several sets of stamp and die, which act vertically upon the face of the metal plate. This is a rather slow and tedious process, whose application is still more limited by the limited tenacity of the metal, and therefore confines itself to the manufacture of shallow vessels and comparatively narrow moldings.

By my process I am enabled to stamp any conical, pyramidical, spheroidical, or elliptic molding, ornament, or other article of any desirable height, and with embossed ornamented face, such as can never be produced by the old process or by rolling—for instance, the capital or base of a Doric or Corinthian column, an ornamented urn or vase, the ornamented base of a lamp, and others.

I proceed as follows: The sheet of metal is cut in strips corresponding in length with the largest circumference and in width with the height of the intended article, making allowance for the corners and the embossing. The ends of the strip are beveled to the general slope of the cone and soldered or lapped together. The hollow cone thus formed is placed on the die and embossed by the action of the corresponding stamp.

It is apparent that by this proceeding, the face of the metal being tangential to the convexities of the die before stamping, the embossing is done without stretching the metal beyond its tenacity.

Now, be it known that I do not claim the stamping of sheet metal in suitable forms, which was known in this and foreign countries for years; but

What I claim as my invention, and desire to secure by Letters Patent, is—

The process of forming an embossed and ornamented article of a conical, pyramidical, spheroidical, or elliptical shape out of a strip of sheet metal by joining the ends together and subsequent stamping, materially as above described.

LOUIS W. HEMP.

Witnesses:
    EDMUND F. SCHREINER,
    ADOLPH E. SCHMIDT.